United States Patent
Feng et al.

(10) Patent No.: US 12,456,730 B2
(45) Date of Patent: Oct. 28, 2025

(54) NEGATIVE ELECTRODE ACTIVE MATERIAL AND ELECTROCHEMICAL DEVICE AND ELECTRONIC DEVICE USING THE SAME

(71) Applicant: Ningde Amperex Technology Limited, Fujian (CN)

(72) Inventors: Pengyang Feng, Fujian (CN); Yuxin Cai, Fujian (CN); Jiali Dong, Fujian (CN); Yuansen Xie, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 676 days.

(21) Appl. No.: 17/708,288

(22) Filed: Mar. 30, 2022

(65) Prior Publication Data
US 2022/0223865 A1    Jul. 14, 2022

Related U.S. Application Data

(63) Continuation of application No. PCT/CN2021/076186, filed on Feb. 9, 2021.

(30) Foreign Application Priority Data

Mar. 20, 2020  (CN) .......................... 202010201979.4

(51) Int. Cl.
*H01M 4/00*    (2006.01)
*H01M 4/583*    (2010.01)
(Continued)

(52) U.S. Cl.
CPC ....... *H01M 4/583* (2013.01); *H01M 10/0525* (2013.01); *H01M 2004/027* (2013.01)

(58) Field of Classification Search
CPC .......................... H01M 4/583; H01M 10/0525
See application file for complete search history.

(56) References Cited

U.S. PATENT DOCUMENTS

| | | |
|---|---|---|
| 2008/0199777 A1 | 8/2008 | Onishi et al. |
| 2011/0171532 A1 | 7/2011 | Okanishi et al. |
| | (Continued) | |

FOREIGN PATENT DOCUMENTS

| | | |
|---|---|---|
| CN | 102037587 A | 4/2011 |
| CN | 102326283 A | 1/2012 |
| | (Continued) | |

OTHER PUBLICATIONS

Fujita et al., Manufacturing Method of Graphite Powder, Oct. 2004, See the Abstract. (Year: 2004).*

(Continued)

*Primary Examiner* — Niki Bakhtiari
*Assistant Examiner* — Monique M Wills
(74) *Attorney, Agent, or Firm* — Maier & Maier, PLLC (57) ABSTRACT

A negative electrode active material having a median particle size $D^1v50$, the negative electrode active material has a median particle size $D^2v50$ after being compressed under a pressure of 1 t, and $D^2v50/D^1v50$ is not less than 0.8. The negative electrode active material achieves a balance between high capacity and high cycle expansion performance of an electrochemical device.

24 Claims, 1 Drawing Sheet

(51) Int. Cl.
   *H01M 10/0525*   (2010.01)
   *H01M 4/02*   (2006.01)

(56) References Cited

U.S. PATENT DOCUMENTS

| | | |
|---|---|---|
| 2012/0070732 A1 | 3/2012 | Kim et al. |
| 2014/0154564 A1 | 6/2014 | Yoo et al. |
| 2020/0056050 A1 | 2/2020 | Atanassova et al. |

FOREIGN PATENT DOCUMENTS

| | | | | |
|---|---|---|---|---|
| CN | 102637859 A | | 8/2012 | |
| CN | 106257713 A | | 12/2016 | |
| CN | 107112537 A | * | 8/2017 | ............ C01B 32/20 |
| CN | 107154495 A | | 9/2017 | |
| CN | 108117071 A | | 6/2018 | |
| CN | 108431998 A | | 8/2018 | |
| CN | 108808006 A | | 11/2018 | |
| CN | 109314239 A | | 2/2019 | |
| CN | 109713264 A | | 5/2019 | |
| CN | 109755493 A | | 5/2019 | |
| CN | 109841831 A | | 6/2019 | |
| CN | 111370695 A | | 7/2020 | |
| EP | 3035420 A1 | | 6/2016 | |
| EP | 3670475 A1 | | 6/2020 | |
| JP | 3582336 B2 | * | 10/2004 | |
| JP | 2009164013 A | | 7/2009 | |
| JP | 2018088425 A | * | 6/2018 | ............ H01M 4/366 |
| WO | 2006025376 A1 | | 3/2006 | |
| WO | 2019035580 A1 | | 2/2019 | |
| WO | 2019124425 A1 | | 6/2019 | |
| WO | WO-2019189800 A1 | * | 10/2019 | ........ H01M 10/0525 |

OTHER PUBLICATIONS

Ikado et al., Lithium Ion Secondary Battery Negative Electrode Material for Manufacturing Method of Graphite Powder, Lithium Ion Secondary Battery Negative Electrode and Lithium Ion Secondary Battery, Aug. 2017, See the Abstract. (Year: 2017).*
Ishiwatari et al., Negative Electrode Material for Nonaqueous Secondary Batteries, Negative Electrode for Nonaqueous Secondary Batteries, and Nonaqueous Secondary Battery, Oct. 2019, See the Abstract. (Year: 2019).*
Inagaki et al., Non-Aqueous Electrolyte Secondary Battery, Battery Pack, and Vehicle, Jun. 2018, See the Abstract. (Year: 2018).*
Office Action issued on Aug. 8, 2023, in corresponding European Application No. 21770876.7, 5 pages.
Extended European Search Report issued on Oct. 7, 2022, in corresponding European Application No. 21770876.7, 7 pages.
Office Action issued on Jan. 26, 2021, in connection with corresponding Chinese Application No. 202010201979.4 (13 pp., including machine-generated English translation).
International Search Report (with English Translation) and Written Opinion (with Machine Translation) issued on May 8, 2021 in corresponding International Patent Application No. PCT/CN2021/076186; 13 pages.
Office Action issued on Feb. 15, 2024, in corresponding European Application No. 21770876.7, 4 pages.
Office Action issued on Aug. 13, 2024, in corresponding European Application No. 21770876.7, 4 pages.
Office Action issued on Mar. 26, 2024, in corresponding Japanese Application No. 2022-552970, 6 pages.
Office Action issued on Mar. 15, 2025, in corresponding Chinese Application No. 202110404739.9, 18 pages.
Office Action issued on Aug. 16, 2025, in corresponding Chinese Application No. 202110404739.9, 17 pages.

* cited by examiner

NEGATIVE ELECTRODE ACTIVE MATERIAL AND ELECTROCHEMICAL DEVICE AND ELECTRONIC DEVICE USING THE SAME

This application is a Bypass continuation application of PCT international application: PCT/CN2021/076186, filed on Feb. 9, 2021, which claims the benefit of priority from the China Patent Application No. 202010201979.4, filed on Mar. 20, 2020, the disclosures of which are hereby incorporated by reference in its entirety.

TECHNICAL FIELD

This application relates to the field of energy storage, and specifically, to a negative electrode active material and an electrochemical device and an electronic device using the same.

BACKGROUND

Electrochemical device (for example, lithium-ion batteries) are widely used due to their environmental friendliness, high working voltage, high specific capacity, and long cycle life. They have become a more promising new green chemical power source in the world. Small-sized lithium-ion batteries are generally used as power sources for driving portable electronic communication devices (for example, camcorders, mobile phones, or notebook computers), especially high-performance portable devices. In recent years, medium- and large-sized lithium-ion batteries with high output have been developed and used in electric vehicles (EV) and large-scale energy storage systems (ESS). With widespread application of the lithium-ion batteries, their cycle performance has become a key technical issue to be addressed urgently. Improving an active material in an electrode is one of research directions to address the issue.

In view of this, it is indeed necessary to provide an improved negative electrode active material and an electrochemical device and an electronic device using the same.

SUMMARY

This application provides a negative electrode active material, and an electrochemical device and an electronic device using the same, in an attempt to resolve, at least to some extent, at least one problem present in the related field.

According to an aspect of this application, this application provides a negative electrode active material, where the negative electrode active material has a median particle size $D^1v50$; after being compressed under a pressure of 1 t, the negative electrode active material has a median particle size $D^2v50$; and $D^2v50/D^1v50$ is greater than or equal to 0.8. In some embodiments, $D^2v50/D^1v50$ of the negative electrode active material is greater than or equal to 0.9. In some embodiments, $D^2v50/D^1v50$ of the negative electrode active material is 0.8, 0.85, 0.9, 0.95, or 1.0.

According to this embodiment of this application, the negative electrode active material has a specific surface area $BET^1$, $BET^1$ is 0.6 m²/g to 2.0 m²/g; after being compressed under a pressure of 1 t, the negative electrode active material has a specific surface area $BET^2$; and $(BET^2-BET^1)/BET^1 \leq 1$. In some embodiments, $BET^1$ is 0.7 m²/g to 1.8 m²/g. In some embodiments, $BET^1$ is 0.8 m²/g to 1.6 m²/g. In some embodiments, $BET^1$ is 0.6 m²/g, 0.7 m²/g, 0.8 m²/g, 0.9 m²/g, 1.0 m²/g, 1.1 m²/g, 1.2 m²/g, 1.3 m²/g, 1.4 m²/g, 1.5 m²/g, 1.6 m²/g, 1.7 m²/g, 1.8 m²/g, 1.9 m²/g, or 2.0 m²/g.

According to this embodiment of this application, the negative electrode active material includes graphite particles, and the graphite particles satisfy at least one of conditions (a) to (c):

(a) $D^1v50$ is 10 μm to 25 μm;
(b) $D^1v90$ and $D^1v10$ satisfy that $D^1v90/D^1v10$ is less than 3.5; or
(c) according to an X-ray diffraction measurement, a grain size La of the graphite particles in a horizontal direction is 160 nm to 165 nm, and a grain size Lc of the graphite particles in a vertical direction is 30 nm to 32 nm.

In some embodiments, $D^1v50$ of the graphite particles is 15 μm to 20 μm. In some embodiments, $D^1v50$ of the graphite particles is 10 μm, 12 μm, 15 μm, 18 μm, 20 μm, 22 μm, or 25 μm.

In some embodiments, $D^1v90/D^1v10$ of the graphite particles is less than 3.0. In some embodiments, $D^1v90/D^1v10$ of the graphite particles is less than 2.5. In some embodiments, $D^1v90/D^1v10$ of the graphite particles is less than 2.0.

In some embodiments, according to an X-ray diffraction measurement, a grain size La of the graphite particles in a horizontal direction is 160 nm, 161 nm, 162 nm, 163 nm, 164 nm, or 165 nm, and a grain size Lc of the graphite particles in a vertical direction is 30 nm, 31 nm, or 32 nm.

According to another aspect of this application, this application provides an electrochemical device, where the electrochemical device includes a negative electrode, the negative electrode includes a negative electrode current collector and a negative electrode active material layer, and the negative electrode active material layer includes the negative electrode active material according to this application.

According to some embodiments of this application, the negative electrode active material layer satisfies at least one of conditions (d) to (f):

(d) the negative electrode active material layer includes the carbon element and the oxygen element, and a ratio of the carbon element content to the oxygen element content is 2:3 to 990:1;
(e) as measured through an X-ray diffraction spectrum, a ratio C004/C110 of the negative electrode active material layer is 5.7 to 18, C004 is a peak area of a (004) plane of the negative electrode active material layer, C110 is a peak area of a (110) plane of the negative electrode active material layer; or
(f) a porosity of the negative electrode active material layer is 20% to 30%.

In some embodiments, a ratio of the carbon element content to the oxygen element content is 1:1 to 800:1. In some embodiments, a ratio of the carbon element content to the oxygen element content is 5:1 to 500:1. In some embodiments, a ratio of the carbon element content to the oxygen element content is 10:1 to 300:1. In some embodiments, a ratio of the carbon element content to the oxygen element content is 50:1 to 100:1. In some embodiments, a ratio of the carbon element content to the oxygen element content is 2:3, 1:1, 5:1, 10:1, 20:1, 50:1, 100:1, 200:1, 300:1, 400:1, 500:1, 600:1, 700:1, 800:1, 900:1, or 990:1.

In some embodiments, C004/C110 of the negative electrode active material layer is 6.0 to 10.0. In some embodiments, C004/C110 of the negative electrode active material layer is 7.0 to 8.0.

In some embodiments, a porosity of the negative electrode active material layer is 20% to 25%. In some embodiments, a porosity of the negative electrode active material layer is 20%, 21%, 22%, 23%, 24%, 25%, 26%, 27%, 28%, 29%, or 30%.

According to this embodiment of this application, when the electrochemical device is in a fully discharged state, as measured through an X-ray diffraction spectrum, a ratio C004'/C110' is 6.8 to 17.2, C004' is a peak area of a (004) plane of the negative electrode active material layer, C110' is a peak area of a (110) plane of the negative electrode active material layer. In some embodiments, C004'/C110' of the negative electrode active material is 7.0 to 16.6. In some embodiments, C004'/C110' of the negative electrode active material is 10.0 to 16.0. In some embodiments, C004'/C110' of the negative electrode active material is 11.0 to 15.5.

According to some embodiments of this application, when the electrochemical device is in a fully discharged state, the negative electrode active material has a median particle size $D^a v50$; after being compressed under a pressure of 1 t, the negative electrode active material has a median particle size $D^b v50$, and $D^b v50/D^a v50$ is greater than or equal to 0.9. In some embodiments, $D^b v50/D^a v50$ of the negative electrode active material is greater than or equal to 0.91. In some embodiments, $D^b v50/D^a v50$ of the negative electrode active material is 0.92, 0.95, 0.98, or 1.0.

According to some embodiments of this application, when the electrochemical device is in a fully discharged state, a median particle size $D^a v50$ of the negative electrode active material is 8 μm to 20 μm. In some embodiments, $D^a v50$ of the negative electrode active material is 10 μm to 15 μm. In some embodiments, $D^a v50$ of the negative electrode active material is 8 μm, 10 μm, 12 μm, 15 μm, 18 μm, or 20 μm.

According to some embodiments of this application, when the electrochemical device is in a fully discharged state, the negative electrode active material has a specific surface area $BET^a$; after being compressed under a pressure of 1 t, the negative electrode active material has a specific surface area $BET^b$, and $(BET^b - BET^a)/BET^a < 0.6$.

According to still another aspect of this application, this application provides an electronic device, where the electronic device includes the electrochemical device according to this application.

Additional aspects and advantages of this application are partially described and presented in the later description, or explained by implementation of the embodiments of this application.

BRIEF DESCRIPTION OF DRAWINGS

Drawings necessary for describing the embodiments of this application or the prior art are briefly described below, to help describe the embodiments of this application. It is obvious that the drawings described below are only some of the embodiments of this application. Those skilled in the art may still obtain drawings of other embodiments based on the results illustrated in these drawings without creative efforts.

DETAILED DESCRIPTION

Embodiments of this application are described in detail below. The embodiments related to the accompanying drawings described herein are illustrative and diagrammatic, and are used to provide a basic understanding of this application. The embodiments of this application shall not be construed as a limitation on this application.

In the description of embodiments and claims, a list of items preceded by the term "at least one of" may mean any combination of the listed items. For example, if items A and B are listed, the phrase "at least one of A and B" means only A; only B; or A and B. In another example, if items A, B, and C are listed, the phrase "at least one of A, B, and C" means only A; only B; only C; A and B (exclusive of C); A and C (exclusive of B); B and C (exclusive of A); or all of A, B, and C. The item A may contain a single element or a plurality of elements. The item B may contain a single element or a plurality of elements. The item C may contain a single element or a plurality of elements.

As used herein, "Dv50" refers to a particle size of a negative electrode active material that reaches 50% of a cumulative volume from a small particle size side in volume-based particle size distribution, that is, a volume of the negative electrode active material whose particle size is less than this particle size accounts for 50% of a total volume of the negative electrode active material.

As used herein, "Dv10" refers to a particle size of a negative electrode active material that reaches 10% of a cumulative volume from a small particle size side in volume-based particle size distribution, that is, a volume of the negative electrode active material whose particle size is less than this particle size accounts for 10% of a total volume of the negative electrode active material.

As used herein, "Dv90" refers to a particle size of a negative electrode active material that reaches 90% of a cumulative volume from a small particle size side in volume-based particle size distribution, that is, a volume of the negative electrode active material whose particle size is less than this particle size accounts for 90% of a total volume of the negative electrode active material.

Dv50, Dv10, and Dv90 of the negative electrode active material may be measured by using a method known in the art, for example, measured by using a laser particle size analyzer (for example, a Malvern particle size tester).

As used herein, "fully discharged state" is a state in which an electrochemical device is constant-current discharged at a discharge current of 1 C (that is, a current that discharges a theoretical capacity completely within 1 hour) to a voltage of 3.0 V in a 25° C. environment.

Unless otherwise specified, the electrochemical device of this application is in a 50% state of charge (SOC).

During cycling of the electrochemical device (a lithium-ion battery is used as an example below), intercalation of lithium ions causes the electrochemical device to swell, which is especially serious at high temperatures. Increasing a degree of recombination of a negative electrode active material (for example, graphite particles) is a way to improve cycle performance of lithium-ion batteries. Primary particles of a negative electrode active material can be recombined to form secondary particles by using a high-viscosity binder or increasing an amount of a binder. This application achieves a balance between high capacity and thickness swelling during cycling of the lithium-ion battery by enhancing strength of the secondary particles.

Specifically, this application provides a negative electrode active material, where the negative electrode active material has a median particle size $D^1 v50$; after being compressed under a pressure of 1 t, the negative electrode active material has a median particle size $D^2 v50$, and $D^2 v50/D^1 v50$ is greater than or equal to 0.8. In some embodiments, $D^2 v50/D^1 v50$ of the negative electrode active material is greater than or equal to 0.9. In some embodiments, $D^2 v50/D^1 v50$ of the negative electrode active material is 0.8, 0.85, 0.9, 0.95, or 1.0. $D^2v50/D^1v50$ of the negative electrode active material may reflect a change rate of a particle size of the negative electrode active material after being compressed. A larger value of $D^2v50/D^1v50$ of the negative electrode active material leads to a lower particle crushing degree of the negative electrode active material after being compressed, a smaller quantity of crushed particles, a lower ratio of crushed particles to total particles of the negative electrode active material (that is, a particle crushing rate), and higher strength of the negative electrode active material, so that crushed surfaces of the negative electrode active material that are not coated with a binder due to compression are reduced. This can inhibit formation of a solid electrolyte interface (SEI) film and help to increase a capacity and an initial coulomb efficiency and reduce a post-cycling thickness swelling rate of a lithium-ion battery. When $D^2v50/D^1v50$ of the negative electrode active material falls within the foregoing range, the negative electrode active material has high strength, which helps to achieve a balance between a high gram capacity and a low post-cycling thickness swelling rate of the lithium-ion battery.

The negative electrode active material of this application can be obtained by the following method: adding a high-viscosity additive to primary particles of the negative electrode active material to obtain a mixture, and sintering the mixture to obtain secondary particles of the negative electrode active material, where the high-viscosity additive includes at least one of oil-based high-temperature asphalt, coal-based high-temperature asphalt, or a resin polymer material, and a content percentage of the high-viscosity additive is not more than 30 wt % based on a total weight of the negative electrode active material.

According to this embodiment of this application, a median particle size $D^1v50$ of the negative electrode active material is 10 μm to 25 μm. In some embodiments, $D^1v50$ of the negative electrode active material is 15 μm to 20 μm. In some embodiments, $D^1v50$ of the negative electrode active material is 10 μm, 12 μm, 15 μm, 18 μm, 20 μm, 22 μm, or 25 μm.

According to this embodiment of this application, after being compressed under a pressure of 1 t, a median particle size $D^2v50$ of the negative electrode active material is 8 μm to 20 μm. In some embodiments, $D^2v50$ of the negative electrode active material is 10 μm to 15 μm. In some embodiments, $D^2v50$ of the negative electrode active material is 8 μm, 10 μm, 12 μm, 15 μm, 18 μm, or 20 μm.

According to this embodiment of this application, $D^1v90$ and $D^1v10$ of the negative electrode active material satisfy that $D^1v90/D^1v10$ is less than 3.5. In some embodiments, $D^1v90/D^1v10$ of the negative electrode active material is less than 3.0. In some embodiments, $D^1v90/D^1v10$ of the negative electrode active material is less than 2.5. In some embodiments, $D^1v90/D^1v10$ of the negative electrode active material is less than 2.0.

According to this embodiment of this application, the negative electrode active material includes crystal grains, and according to an X-ray diffraction measurement, a grain size La of the crystal grains in a horizontal direction is 160 nm to 165 nm, and a grain size Lc of the crystal grains in a vertical direction is 30 nm to 32 nm. In some embodiments, the negative electrode active material includes crystal grains, and according to an X-ray diffraction measurement, a grain size La of the crystal grains in a horizontal direction is 161 nm to 164 nm, and a grain size Lc of the crystal grains in a vertical direction is 30.5 nm to 31.5 nm. In some embodiments, according to an X-ray diffraction method, a grain size La of the graphite particles in a horizontal direction is 160 nm, 161 nm, 162 nm, 163 nm, 164 nm, or 165 nm, and a grain size Lc of the graphite particles in a vertical direction is 30 nm, 31 nm, or 32 nm.

According to this embodiment of this application, the negative electrode active material includes graphite particles, and the graphite particles have the same $D^1v50$, $D^2v50$, $D^1v90$, and $D^1v10$ as the negative electrode active material. In some embodiments, the negative electrode active material is graphite particles.

According to this embodiment of this application, the negative electrode active material has a specific surface area $BET^1$, $BET^1$ is 0.6 m²/g to 2.0 m²/g; after being compressed under a pressure of 1 t, the negative electrode active material has a specific surface area $BET^2$, and $(BET^2-BET^1)/BET^1 \leq 1$. When the negative electrode active material satisfies that $(BET^2-BET^1)/BET^1 \leq 1$, a growth rate of the specific surface area of the negative electrode active material after being compressed is less than or equal to 100% compared with the negative electrode active material without being compressed. A lower growth rate of the specific surface area of the negative electrode active material leads to higher strength of the negative electrode active material, so that crushed surfaces of the negative electrode active material that are not coated with a binder due to compression are reduced, and a quantity of formed solid electrolyte interface (SEI) films is reduced. This helps to increase a capacity and an initial coulomb efficiency and reduce a post-cycling thickness swelling rate of a lithium-ion battery.

In some embodiments, $BET^1$ is 0.7 m²/g to 1.8 m²/g. In some embodiments, $BET^1$ is 0.8 m²/g to 1.6 m²/g. In some embodiments, $BET^1$ is 0.6 m²/g, 0.7 m²/g, 0.8 m²/g, 0.9 m²/g, 1.0 m²/g, 1.1 m²/g, 1.2 m²/g, 1.3 m²/g, 1.4 m²/g, 1.5 m²/g, 1.6 m²/g, 1.7 m²/g, 1.8 m²/g, 1.9 m²/g, or 2.0 m²/g.

According to this embodiment of this application, after being compressed under a pressure of 1 t, the specific surface area $BET^2$ of the negative electrode active material is 1.2 m²/g to 4.0 m²/g. In some embodiments, $BET^2$ of the negative electrode active material is 1.5 m²/g to 3.0 m²/g. In some embodiments, $BET^2$ of the negative electrode active material is 1.2 m²/g, 1.5 m²/g, 2 m²/g, 2.5 m²/g, 3 m²/g, 3.5 m²/g, or 4.0 m²/g.

Parameters of the negative electrode active material after being compressed under the pressure of 1 t may be obtained by referring to the steps in China National Standard GB/T24533-2009.

The specific surface area of the negative electrode active material may be obtained by the following method:

A specific surface area analyzer (for example, Tristar II 3020M) is used to measure the specific surface area of the negative electrode active material by using a nitrogen adsorption/desorption method: drying a sample of the negative electrode active material in a vacuum drying oven, putting the sample into a sample tube, and measuring the sample in the analyzer. This application further provides an electrochemical device, where the electrochemical device includes a negative electrode, and the negative electrode includes a negative electrode current collector and a negative electrode active material layer.

Negative Electrode

In the electrochemical device of this application, the negative electrode active material layer includes the negative electrode active material according to this application.

According to this embodiment of this application, the negative electrode active material layer includes the carbon element and the oxygen element, where a ratio of the carbon element content to the oxygen element content is 2:3 to 990:1. In some embodiments, a ratio of the carbon element content to the oxygen element content is 1:1 to 800:1. In some embodiments, a ratio of the carbon element content to the oxygen element content is 5:1 to 500:1. In some embodiments, a ratio of the carbon element content to the oxygen element content is 10:1 to 300:1. In some embodiments, a ratio of the carbon element content to the oxygen element content is 50:1 to 100:1. In some embodiments, a ratio of the carbon element content to the oxygen element content is 2:3, 1:1, 5:1, 10:1, 20:1, 50:1, 100:1, 200:1, 300:1, 400:1, 500:1, 600:1, 700:1, 800:1, 900:1, or 990:1. When the ratio of the carbon element content to the oxygen element content in the negative electrode active material layer falls within the foregoing range, a particle size and a graphitization degree of particles of the negative electrode active material fall within a suitable range, which helps to increase a capacity and reduce a post-cycling thickness swelling rate of a lithium-ion battery.

According to this embodiment of this application, in the negative electrode active material layer, as measured through an X-ray diffraction spectrum, a ratio C004/C110 of the negative electrode active material layer is 5.7 to 11.2, C004 is a peak area of a (004) plane of the negative electrode active material layer, C110 is a peak area of a (110) plane of the negative electrode active material layer. The C004/C110 value of the negative electrode active material layer measured through the X-ray diffraction spectrum may reflect anisotropy of the particles of the negative electrode active material. A smaller C004/C110 value leads to lower anisotropy, which helps to reduce the post-cycling thickness swelling rate of the lithium-ion battery. In some embodiments, C004/C110 of the negative electrode active material layer is 6.0 to 10.0. In some embodiments, C004/C110 of the negative electrode active material layer is 7.0 to 8.0.

According to this embodiment of this application, a porosity of the negative electrode active material layer is 20% to 30%. In some embodiments, the porosity of the negative electrode active material layer is 20% to 25%. In some embodiments, the porosity of the negative electrode active material layer is 20%, 21%, 22%, 23%, 24%, 25%, 26%, 27%, 28%, 29%, or 30%.

According to this embodiment of this application, when the electrochemical device is in a fully discharged state, as measured through an X-ray diffraction spectrum, a ratio C004'/C110' is 6.8 to 17.2, C004' is a peak area of a (004) plane of the negative electrode active material, C110' is a peak area of a (110) plane of the negative electrode active material. In some embodiments, C004'/C110' of the negative electrode active material is 7.0 to 16.5. In some embodiments, C004'/C110' of the negative electrode active material is 10.0 to 15.0. In some embodiments, C004'/C110' of the negative electrode active material is 12.0 to 14.0. When C004'/C110' of the negative electrode active material is 6.8 to 17.2, the anisotropy of the particles of the negative electrode active material in the electrochemical device in a fully discharged state is still low, which can reflect that the negative electrode active material has high strength.

According to this embodiment of this application, when the electrochemical device is in a fully discharged state, the negative electrode active material has a median particle size $D^a v50$, the negative electrode active material has a median particle size $D^b v50$ after being compressed under a pressure of 1 t, and $D^b v50/D^a v50$ is not less than 0.9. $D^b v50/D^a v50$ of the negative electrode active material may reflect the particle crushing degree of the negative electrode active material in the electrochemical device in the fully discharged state. A larger value of $D^b v50/D^a v50$ of the negative electrode active material leads to a lower particle crushing degree of the negative electrode active material in the electrochemical device in the fully discharged state after being compressed, a smaller quantity of crushed particles, a lower ratio of crushed particles to total particles of the negative electrode active material (that is, a particle crushing rate), and higher strength of the negative electrode active material. When $D^b v50/D^a v50$ of the negative electrode active material falls within the foregoing range, the negative electrode active material in the electrochemical device in the fully discharged state still has high strength, which helps to further increase the initial coulomb efficiency of the lithium-ion battery and reduce the post-cycling thickness swelling rate of the lithium-ion battery. In some embodiments, $D^b v50/D^a v50$ of the negative electrode active material is 0.92, 0.95, 0.98, or 1.0.

According to this embodiment of this application, when the electrochemical device is in a fully discharged state, a median particle size $D^a v50$ of the negative electrode active material is 8 μm to 20 μm. In some embodiments, $D^a v50$ of the negative electrode active material is 10 μm to 15 μm. In some embodiments, $D^a v50$ of the negative electrode active material is 8 μm, 10 μm, 12 μm, 15 μm, 18 μm, or 20 μm.

According to this embodiment of this application, when the electrochemical device is in a fully discharged state, a median particle size $D^b v50$ of the negative electrode active material after being compressed under a pressure of 1 t is 7.2 μm to 18 μm. In some embodiments, $D^b v50$ of the negative electrode active material is 8 μm to 15 μm. In some embodiments, $D^b v50$ of the negative electrode active material is 7.2 μm, 8 μm, 10 μm, 12 μm, 15 μm, or 18 μm.

According to this embodiment of this application, when the electrochemical device is in a fully discharged state, the negative electrode active material has a specific surface area $BET^a$; after being compressed under a pressure of 1 t, the negative electrode active material has a specific surface area $BET^b$, and $(BET^b - BET^a)/BET^a < 0.6$. When the negative electrode active material satisfies that $(BET^b - BET^a)/BET^a < 0.6$, a growth rate of the specific surface area of the negative electrode active material after being compressed is less than 60% compared with the negative electrode active material without being compressed. When the specific surface area of the negative electrode active material in the electrochemical device in the fully discharged state conforms to the foregoing relationship, it can reflect that strength of the negative electrode active material is relatively high.

According to this embodiment of this application, when the electrochemical device is in a fully discharged state, a specific surface area $BET^a$ of the negative electrode active material is 0.6 m²/g to 2.0 m²/g. In some embodiments, $BET^a$ of the negative electrode active material is 0.8 m²/g to 1.5 m²/g. In some embodiments, $BET^a$ of the negative electrode active material is 1.0 m²/g to 1.2 m²/g. In some embodiments, $BET^a$ of the negative electrode active material is 0.6 m²/g, 0.7 m²/g, 0.8 m²/g, 0.9 m²/g, 1.0 m²/g, 1.1 m²/g, 1.2 m²/g, 1.3 m²/g, 1.4 m²/g, 1.5 m²/g, 1.6 m²/g, 1.7 m²/g, 1.8 m²/g, 1.9 m²/g, or 2.0 m²/g.

According to this embodiment of this application, when the electrochemical device is in a fully discharged state, after being compressed under a pressure of 1 t, a specific surface area $BET^b$ of the negative electrode active material is 0.96 m²/g to 3.2 m²/g. In some embodiments, $BET^2$ of the negative electrode active material is 1.0 m²/g to 3.0 m²/g. In some embodiments, $BET^2$ of the negative electrode active material is 1.5 m²/g to 2.0 m²/g. In some embodiments, $BET^2$ of the negative electrode active material is 0.96 m²/g, 1.0 m²/g, 1.2 m²/g, 1.5 m²/g, 1.8 m²/g, 2.0 m²/g, 2.2 m²/g, 2.5 m²/g, 2.8 m²/g, 3.0 m²/g, or 3.2 m²/g.

According to this embodiment of this application, the negative electrode current collector used for this application may be selected from copper foil, nickel foil, stainless steel foil, titanium foil, nickel foam, copper foam, a polymer base coated with conductive metal, and a combination thereof.

According to this embodiment of this application, the negative electrode further includes a conductive layer. In some embodiments, a conductive material of the conductive layer may include any conductive material that causes no chemical change. Non-limiting examples of the conductive material include: a carbon-based material (for example, natural graphite, artificial graphite, carbon black, acetylene black, Ketjen black, carbon fiber, carbon nanotubes, and graphene), a metal-based material (for example, metal powder, and metal fiber, such as copper, nickel, aluminum, and silver), a conductive polymer (for example, a polyphenylene derivative), and any mixture thereof.

According to this embodiment of this application, the negative electrode further includes a binder, and the binder is selected from at least one of the following: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, or nylon.

According to this embodiment of this application, the negative electrode can be manufactured by any method known in the prior art. In some embodiments, the negative electrode can be formed by adding a binder and a solvent into the negative electrode active material, adding a thickener, a conductive material, and a filler as needed to make a slurry, coating the slurry on the current collector, and performing compression after drying.

According to this embodiment of this application, when the negative electrode includes an alloy material, the negative electrode active material layer can be formed by using methods such as vapor deposition method, sputtering method, and plating method.

Positive Electrode

The positive electrode includes a positive electrode current collector and a positive electrode active material provided on the positive electrode current collector. The specific types of the positive electrode active material are not subject to specific restrictions, and can be selected according to requirements.

According to this embodiment of this application, the positive electrode active material includes a compound that reversibly intercalates and deintercalates a lithium ion. In some embodiments, the positive electrode active material may include a composite oxide, and the composite oxide contains lithium and at least one element selected from cobalt, manganese, and nickel. In still other embodiments, the positive electrode active material is selected from one or more of lithium cobalt oxide (LiCoO$_2$), a lithium nickel manganese cobalt ternary material, lithium manganese oxide (LiMn$_2$O$_4$), lithium nickel manganese oxide (LiNi$_{0.5}$Mn$_{1.5}$O$_4$), and lithium iron phosphate (LiFePO$_4$).

According to this embodiment of this application, a positive electrode active material layer may have a coating on a surface, or may be mixed with another compound having a coating. The coating may include at least one compound of a coating element selected from oxides of the coating element, hydroxides of the coating element, oxyhydroxides of the coating element, oxycarbonates (oxycarbonate) of the coating element, and hydroxycarbonates (hydroxycarbonate) of the coating element. The compound used for coating may be amorphous or crystalline. The coating element contained in the coating may include Mg, Al, Co, K, Na, CA, Si, Ti, V, Sn, Ge, Ga, B, As, Zr, F, or a combination thereof. The coating may be applied by any method as long as the method does not adversely affect the performance of the positive electrode active material. For example, the method may include any coating method well known to those of ordinary skill in the art, for example, spraying and dipping.

According to this embodiment of this application, the positive electrode active material layer further includes a binder, and optionally, further includes a positive electrode conductive material.

The binder enhances binding between particles of the positive electrode active material, and binding between the positive electrode active material and the current collector. Non-limiting examples of the binder include: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(vinylidene fluoride), polyethylene, polypropylene, styrene-butadiene rubber, acrylic styrene-butadiene rubber, epoxy resin, and nylon.

The positive electrode active material layer includes the positive electrode conductive material, making the electrodes conductive. The positive electrode conductive material may include any conductive material that causes no chemical change. Non-limiting examples of the positive electrode conductive material include: a carbon-based material (for example, natural graphite, artificial graphite, carbon black, acetylene black, Ketjen black, and carbon fiber), a metal-based material (for example, metal powder, and metal fiber, including copper, nickel, aluminum, silver, and the like), a conductive polymer (for example, a polyphenylene derivative), and a mixture thereof.

The positive electrode current collector used in the electrochemical device according to this application may be, but is not limited to, aluminum (Al).

Electrolyte Solution

An electrolytic solution which can be used in the embodiments of this application may be an electrolytic solution known in the prior art. An electrolyte that can be used in the electrolyte solution of the embodiments of this application includes, but is not limited to: inorganic lithium salts, such as LiClO$_4$, LiAsF$_6$, LiPF$_6$, LiBF$_4$, LiSbF$_6$, LiSO$_3$F, and LiN(FSO$_2$)$_2$; fluorine-containing organic lithium salts, such as LiCF$_3$SO$_3$, LiN(FSO$_2$)(CF$_3$SO$_2$), LiN(CF$_3$SO$_2$)$_2$, LiN(C$_2$F$_5$SO$_2$)$_2$, cyclic 1,3-hexafluoropropane disulfonimide lithium, cyclic 1,2-tetrafluoroethane disulfonimide lithium, LiN(CF$_3$SO$_2$)(C$_4$F$_9$SO$_2$), LiC(CF$_3$SO$_2$)$_3$, LiPF$_4$(CF$_3$)$_2$, LiPF$_4$(C$_2$F$_5$)$_2$, LiPF$_4$(CF$_3$SO$_2$)$_2$, LiPF$_4$(C$_2$F$_5$SO$_2$)$_2$, LiBF$_2$(CF$_3$)$_2$, LiBF$_2$(C$_2$F$_5$)$_2$, LiBF$_2$(CF$_3$SO$_2$)$_2$, and LiBF$_2$(C$_2$F$_5$SO$_2$)$_2$; lithium salts containing dicarboxylic acid complex, such as bis(oxalato) lithium borate, difluorooxalato lithium borate, tris(oxalato) lithium phosphate, difluorobis (oxalato) lithium phosphate, and tetrafluoro(oxalato) lithium phosphatee. In addition, the above electrolyte may be used alone, or two or more electrolytes may be used simultaneously. For example, in some embodiments, the electrolyte includes a combination of LiPF$_6$ and LiBF$_4$. In some embodiments, the electrolyte includes a combination of an inorganic lithium salt such as LiPF$_6$ or LiBF$_4$ and a fluorine-containing organic lithium salt such as $LiCF_3SO_3$, $LiN(CF_3SO_2)_2$, and $LiN(C_2F_5SO_2)_2$.

In some embodiments, a concentration of the electrolyte falls within a range of 0.8 mol/L to 3 mol/L, for example, a range of 0.8 mol/L to 2.5 mol/L, a range of 0.8 mol/L to 2 mol/L, a range of 1 mol/L to 2 mol/L, for another example, 1 mol/L, 1.15 mol/L, 1.2 mol/L, 1.5 mol/L, 2 mol/L, or 2.5 mol/L.

A solvent that can be used in the electrolyte solution of the embodiments of this application includes, but is not limited to, a carbonate compound, an ester-based compound, an ether-based compound, a ketone-based compound, an alcohol-based compound, an aprotic solvent, or a combination thereof.

An example of the carbonate compound includes, but is not limited to, a linear carbonate compound, a cyclic carbonate compound, a fluorocarbonate compound, or a combination thereof.

An example of the linear carbonate compound includes, but is not limited to, diethyl carbonate (DEC), dimethyl carbonate (DMC), dipropyl carbonate (DPC), methyl propyl carbonate (MPC), ethylene propyl carbonate (EPC), ethyl methyl carbonate (MEC), or a combination thereof. An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 4,5-difluoro-1,3-dioxolan-2-one, 4,4-difluoro-1,3-dioxolan-2-one, 4,4,5-trifluoro-1,3-dioxolan-2-one, 4,4,5,5-tetrafluoro-1,3-dioxolan-2-one, 4-fluoro-5-methyl-1,3-dioxolan-2-one, 4-fluoro-4-methyl-1,3-dioxolan-2-one, 4,5-difluoro-4-methyl-1,3-dioxolan-2-one, 4,4,5-trifluoro-5-methyl-1,3-dioxolan-2-one, 4-(trifluoromethyl)-1,3-dioxolan-2-one, or a combination thereof.

An example of the carboxylate compound includes, but is not limited to, methyl acetate, ethyl acetate, n-propyl acetate, tert-butyl acetate, methyl propionate, ethyl propionate, γ-butyrolactone ester, caprolactone, valerolactone, mevalonolactone, caprolactone, methyl formate, or a combination thereof.

An example of the ether compound includes, but is not limited to, dibutyl ether, tetraglyme, diglyme, 1,2-dimethoxyethane, 1,2-diethoxyethane, ethoxymethoxyethane, 2-methyltetrahydrofuran, tetrahydrofuran, or a combination thereof.

An example of the ketone-based compound includes, but is not limited to, cyclohexanone.

An example of the alcohol-based compound includes, but is not limited to, ethanol and isopropanol.

An example of the aprotic solvent includes, but is not limited to, dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, nitromethane, trimethyl phosphate, triethyl phosphate, trioctyl phosphate, phosphate ester, or a combination thereof.

Separator

In some embodiments, a separator is provided between the positive electrode and the negative electrode to prevent a short circuit. A material and shape of the separator which can be used in the embodiments of this application may include any technology disclosed in the prior art. In some embodiments, the separator includes a polymer or an inorganic substance formed by a material stable to the electrolytic solution of this application.

For example, the separator may include a substrate layer and a surface treatment layer. The substrate layer is a non-woven fabric, a membrane or a composite membrane having a porous structure, and a material of the substrate layer is selected from at least one of polyethylene, polypropylene, polyethylene terephthalate, and polyimide. Specifically, a polypropylene porous membrane, a polyethylene porous membrane, a polypropylene non-woven fabric, a polyethylene non-woven fabric or a polypropylene-polyethylene-polypropylene porous composite membrane can be selected. The porous structure can increase heat resistance, oxidation resistance, and electrolyte infiltration performance of the separator, and enhance adhesion between the separator and electrodes.

The surface treatment layer is provided on at least one surface of the substrate layer, and the surface treatment layer may be a polymer layer or an inorganic layer, or may be a layer formed by a mixed polymer and an inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene.

The polymer layer contains a polymer, and a material of the polymer is selected from at least one of polyamide, polyacrylonitrile, an acrylate polymer, polyacrylic acid, polyacrylate, polyvinylpyrrolidone, polyvinyl ether, polyvinylidene fluoride, or poly(vinylidene fluoride-hexafluoropropylene).

Application

The electrochemical device according to this application includes any device in which electrochemical reactions take place. Specific examples of the device include all kinds of primary batteries, secondary batteries, fuel batteries, solar batteries, or capacitors. Especially, the electrochemical device is a lithium secondary battery, including lithium metal secondary batteries, lithium-ion secondary batteries, lithium polymer secondary batteries, or lithium-ion polymer secondary batteries.

This application further provides an electronic device, including the electrochemical device according to this application.

The electrochemical device of this application is not particularly limited to any purpose, and may be used for any known electronic device in the prior art. In some embodiments, the electrochemical device of this application may be used for, without limitation to: a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notebook, a calculator, a memory card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, a lithium-ion capacitor, or the like.

Lithium-ion batteries are used as an example below in combination with specific examples to describe preparation of a lithium-ion battery. Those skilled in the art should understand that the preparation method described in this application is only an example, and any other suitable preparation methods are within the scope of this application.

EXAMPLES

Performance evaluation is carried out below based on examples and comparative examples of the lithium-ion battery according to this application.

I. Preparation of a Lithium-Ion Battery

1. Preparation of a Negative Electrode

Coke was crushed so that its median particle size Dv50 fell within a range of 3 μm to 10 μm, and then a binder asphalt with a softening point of 100° C. to 300° C. was added (amounts of the added asphalt in Examples 1 to 16 and 18 to 39 were 15 wt %, and an amount of the added asphalt in Example 17 was 5 wt %). A mixture of the two was put into granulation equipment for granulation, during which the mixture was continuously stirred and heated to 500° C. to 1000° C., then a graphitization process (in which a graphitization temperature was controlled at 2000° C. to 3500° C.) was performed, and a graphite negative electrode active material used in the following examples was obtained.

The coke was crushed so that its median particle size Dv50 fell within the range of 3 μm to 10 μm, a mixture was put into granulation equipment for granulation, during which the mixture was continuously stirred and heated to 500° C. to 1000° C., then a graphitization process (in which a graphitization temperature was controlled at 2000° C. to 3500° C.) was performed, and a graphite negative electrode active material used in Comparative Example 1 was obtained.

The prepared graphite negative electrode active material, styrene-butadiene rubber (SBR), and sodium carboxymethyl cellulose (CMC) were dispersed in deionized water at a weight ratio of 97.7:1.2:1.1, fully stirred and mixed uniformly to obtain a negative electrode slurry. The negative electrode slurry was coated on a negative electrode current collector, dried, and cold pressed to form a negative electrode active material layer, and then the current collector was cut and welded with tabs to obtain a negative electrode.

Graphite particles of different particle sizes could be obtained by crushing and grading raw materials by using any known technology.

2. Preparation of a Positive Electrode

Lithium cobaltate ($LiCoO_2$), acetylene black, and polyvinylidene fluoride (PVDF) were fully stirred and well mixed in an appropriate amount of N-methylpyrrolidone (NMP) at a weight ratio of 96:2:2, a mixture was coated on a positive electrode current collector fluid aluminum foil, dried and cold pressed to form a positive electrode active material layer, and then the current collector was cut and welded with tabs to obtain a positive electrode.

3. Preparation of an Electrolyte Solution

In a dry argon environment, ethylene carbonate (EC), propylene carbonate (PC), and diethyl carbonate (DEC) were mixed at a weight ratio of 1:1:1, and $LiPF_6$ was added and mixed well. 3% fluoroethylene carbonate was added and mixed well to obtain the electrolyte solution, in which a concentration of $LiPF_6$ was 1.15 mol/L.

4. Preparation of a Separator

A polyethylene (PE) porous polymer film with a thickness of 12 μm was used as the separator.

5. Preparation of a Lithium-Ion Battery

The positive electrode, separator, and negative electrode were stacked in order, so that the separator was placed between the positive electrode plate and the negative electrode plate for separation. Then the battery was wound with tabs welded thereto and was placed in an outer packaging aluminum foil film. Then the foregoing prepared electrolyte solution was injected, followed by processes such as vacuum packaging, standing, chemical conversion, shaping and capacity testing, to obtain a lithium-ion battery.

II. Test Methods

1. Test Method for a Particle Size of the Negative Electrode Active Material

A Malvern particle size tester was used to measure a particle size of the negative electrode active material: A sample of the negative electrode active material was dispersed in dispersant ethanol, and ultrasonicated for 30 minutes. The sample was put into the Malvern particle size tester to test Dv50, Dv10, and Dv90 of the negative electrode active material.

2. Test Method for a Specific Surface Area of the Negative Electrode Active Material A specific surface area analyzer (Tristar II 3020M) was used to measure a specific surface area of the negative electrode active material by using a nitrogen adsorption/desorption method: A sample of the negative electrode active material was added into a vacuum drying oven for drying, and then was put into a sample tube to measure the sample in the analyzer.

3. Test Method for a Gram Capacity of the Lithium-Ion Battery

The lithium-ion battery was discharged at 0.05 C to 5.0 mV, at 50 μA to 5.0 mV, at 10 μA to 5.0 mV, and charged at 0.1 C to 2.0 V. A capacity of the lithium-ion battery was recorded at this time as a gram capacity. 0.05 C is a current value under 0.05 times the designed gram capacity, and 0.1 C is a current value under 0.1 times the designed gram capacity.

4. Test Method for a Post-Cycling Thickness Swelling Rate of the Lithium-Ion Battery At 45° C., a micrometer was used to test a thickness of the lithium-ion battery in an initial half-charged state, which was denoted as $H_0$. The lithium-ion battery was charged and discharged for 500 cycles at a rate of 1.5 C, during which, after each 50 cycles, the thickness of the lithium-ion battery in the fully charged state was measured and denoted as $H_n$. The post-cycling thickness swelling rate of the lithium-ion battery was calculated based on the following formula:

Post-cycling thickness swelling rate corresponding to a quantity of cycles=$(H_n-H_0)/H_0\times100\%$.

5. Test Method for an Initial Coulomb Efficiency of the Lithium-Ion Battery

The lithium-ion battery was charged at 0.5 C to 4.45 V, and an initial charge capacity C was recorded. Then the lithium-ion battery was discharged at 0.5 C to 3.0 V, and its discharge capacity D was recorded. The initial coulomb efficiency CE of the lithium-ion battery was calculated based on the following formula:

$CE=D/C$.

III. Test Results

Table 1 shows influence of characteristics of the negative electrode active material on the gram capacity and post-cycling thickness swelling rate of the lithium-ion battery during the preparation of the negative electrode active material.

TABLE 1

| | $D^1v50$ (μm) | $D^2v50/D^1v50$ | $BET^1$ ($m^2/g$) | $(BET^2 - BET^1)/BET^1$ | Carbon element/ oxygen element weight ratio | Gram capacity (mAh/g) | Post-cycling thickness swelling rate (500 cycles) |
|---|---|---|---|---|---|---|---|
| Example 1 | 10 | 0.942 | 1.2 | 0.85 | 602 | 355 | 10.0% |
| Example 2 | 15 | 0.900 | 1.0 | 0.88 | 739 | 356 | 9.5% |
| Example 3 | 18 | 0.836 | 0.9 | 0.90 | 821 | 357 | 9.3% |
| Example 4 | 20 | 0.8 | 0.6 | 0.98 | 989 | 359 | 9.1% |
| Example 5 | 10 | 0.972 | 1.7 | 0.61 | 437 | 353 | 9.3% |
| Example 6 | 15 | 0.969 | 1.7 | 0.63 | 582 | 353 | 9.2% |
| Example 7 | 18 | 0.962 | 1.5 | 0.68 | 672 | 354 | 9.0% |
| Example 8 | 20 | 0.951 | 1.2 | 0.72 | 783 | 356 | 8.9% |
| Example 9 | 10 | 0.992 | 1.8 | 0.41 | 265 | 351 | 9.2% |
| Example 10 | 15 | 0.99 | 1.8 | 0.46 | 298 | 352 | 9.0% |
| Example 11 | 18 | 0.989 | 1.5 | 0.50 | 378 | 354 | 8.6% |
| Example 12 | 20 | 0.987 | 1.4 | 0.52 | 499 | 354 | 8.5% |
| Example 13 | 10 | 0.998 | 2.0 | 0.17 | 15 | 349 | 8.9% |
| Example 14 | 15 | 0.996 | 1.9 | 0.20 | 59 | 350 | 8.5% |
| Example 15 | 18 | 0.994 | 1.8 | 0.26 | 167 | 351 | 8.3% |
| Example 16 | 20 | 0.993 | 1.8 | 0.33 | 287 | 352 | 8.2% |
| Example 17 | 19 | 0.810 | 0.7 | 0.95 | 900 | 358 | 9.9% |
| Example 18 | 25 | 0.955 | 2.5 | 0.70 | 1025 | 350 | 10.2% |
| Example 19 | 8 | 0.998 | 3.2 | 0.92 | 113 | 347 | 8.9% |
| Example 20 | 26 | 0.968 | 2.3 | 0.68 | 980 | 352 | 12.2% |
| Comparative Example 1 | 20 | 0.520 | 1.9 | 1.50 | 997 | 345 | 12.8% |

As shown in Comparative Example 1, no high-viscosity binder was added during the preparation of the negative electrode active material, the negative electrode active material was primary particles, and the primary particles were not recombined to form secondary particles. Although the resulting lithium-ion battery had a relatively high gram capacity, the negative electrode active material had relatively high anisotropy, leading to a high post-cycling thickness swelling rate of the lithium-ion battery and poor performance.

As shown in Examples 1 to 20, when the negative electrode active material was prepared, an appropriate amount of high-viscosity binder was added so that $D^2v50/D^1v50$ of the negative electrode active material was not less than 0.8. In this way, the lithium-ion battery not only had a high gram capacity, but also had a low post-cycling thickness swelling rate, implementing balance between a high gram capacity and a low post-cycling thickness swelling rate.

When a content percentage of the high-viscosity binder was constant, and when the median particle size $D^1v50$ of the negative electrode active material was gradually increased in the range of 10 μm to 25 μm, a ratio $D^2v50/D^1v50$ of the median particle size $D^2v50$ of the negative electrode active material after being compressed under a pressure of 1 t to $D^1v50$ was decreased, $(BET^2-BET^1)/BET^1$ of the negative electrode active material was increased, and the weight ratio of the carbon element to the oxygen element was increased, so that the gram capacity of the lithium-ion battery was increased and the post-cycling thickness swelling rate was decreased. When the specific surface area of the negative electrode active material satisfied that $BET^1$ fell within the range of 0.6 $m^2/g$ to 2.0 $m^2/g$ and $(BET^2-BET^1)/BET^1 \leq 1$ and/or a content ratio of the carbon element to the oxygen element in the negative electrode active material layer fell within a range of 2:3 to 990:1, further balance between a high gram capacity and a low post-cycling thickness swelling rate could be achieved.

Table 2 shows influence of $D^1v90/D^1v10$ and C004/C110 of the negative electrode active material on the initial coulomb efficiency and post-cycling thickness swelling rate of the lithium-ion battery. Except for parameters listed in Table 2, conditions of Examples 21 to 39 were the same as those of Example 8.

TABLE 2

| | $D^1v90/D^1v10$ | C004/C110 | La (nm) | Lc (nm) | Porosity | Initial coulomb efficiency | Post-cycling thickness swelling rate (500 cycles) |
|---|---|---|---|---|---|---|---|
| Example 8 | 3.6 | 10 | 163.4 | 30.9 | 30.0% | 90.2% | 7.9% |
| Example 21 | 2.0 | 6 | 160.0 | 32.0 | 29.3% | 90.4% | 6.8% |
| Example 22 | 2.4 | 6 | 160.3 | 31.9 | 29.0% | 90.5% | 7.0% |
| Example 23 | 3.0 | 6 | 160.4 | 31.8 | 28.5% | 90.5% | 7.1% |
| Example 24 | 3.5 | 6 | 160.6 | 31.7 | 28.3% | 90.5% | 7.2% |
| Example 25 | 2.0 | 8 | 161.0 | 31.5 | 27.6% | 90.8% | 7.5% |
| Example 26 | 2.4 | 8 | 161.3 | 31.5 | 27.1% | 90.8% | 7.5% |
| Example 27 | 3.0 | 8 | 161.7 | 31.5 | 27.1% | 90.8% | 7.7% |
| Example 28 | 3.5 | 8 | 162.0 | 31.4 | 26.9% | 90.0% | 7.9% |
| Example 29 | 2.0 | 10 | 162.3 | 31.3 | 24.6% | 91.4% | 8.1% |
| Example 30 | 2.4 | 10 | 162.6 | 31.1 | 24.5% | 91.4% | 8.3% |
| Example 31 | 3.0 | 10 | 163.1 | 31.1 | 24.0% | 91.5% | 8.4% |
| Example 32 | 3.5 | 10 | 163.3 | 30.9 | 23.9% | 91.5% | 8.5% |
| Example 33 | 2.0 | 11 | 163.6 | 30.8 | 22.8% | 91.9% | 8.6% |

TABLE 2-continued

|  | $D^1v90/$ $D^1v10$ | C004/ C110 | La (nm) | Lc (nm) | Porosity | Initial coulomb efficiency | Post-cycling thickness swelling rate (500 cycles) |
|---|---|---|---|---|---|---|---|
| Example 34 | 2.4 | 11 | 163.7 | 30.8 | 23.0% | 92.0% | 8.7% |
| Example 35 | 3.0 | 11 | 164.1 | 30.6 | 23.1% | 92.0% | 8.8% |
| Example 36 | 3.5 | 11 | 164.6 | 30.4 | 23.5% | 92.1% | 8.9% |
| Example 37 | 4.0 | 11 | 164.8 | 30.3 | 23.1% | 90.1% | 9.5% |
| Example 38 | 2.4 | 16 | 165.0 | 30.0 | 21.2% | 92.5% | 10.7% |
| Example 39 | 2.8 | 20 | 175.0 | 28.0 | 21.0% | 90.0% | 12.7% |

The results show that when $D^1v90/D^1v10$ of the negative electrode active material was less than 3.5, the initial coulomb efficiency of the lithium-ion battery was significantly increased. When $D^1v90/D^1v10$ of the negative electrode active material was gradually decreased in the range of less than 3.5, the initial coulomb efficiency of the lithium-ion battery did not change much, and the post-cycling thickness swelling rate was gradually decreased. When C004/C110 of the negative electrode active material layer was gradually decreased in the range of 5.7 to 18, the grain size La of the graphite particles was decreased, Lc was increased, the porosity was increased, the post-cycling thickness swelling rate of the lithium-ion battery was gradually decreased, and the initial coulomb efficiency was slightly decreased. In conclusion, when the negative electrode active material satisfied that $D^1v90/D^1v10$ was less than 3.5, C004/C110 fell within the range of 5.7 to 18, La was 160 nm to 165 nm, Lc was 30 nm to 32 nm, and/or the porosity was 20% to 30%, the lithium-ion battery achieved a balance between the initial coulomb efficiency and the post-cycling thickness swelling rate.

Table 3 shows influence of characteristics of the negative electrode active material on the initial coulomb efficiency and post-cycling thickness swelling rate of the lithium-ion battery when the lithium-ion battery is in a fully discharged state.

TABLE 3

|  | $D^av50$ (μm) | $D^bv50/$ $D^av50$ | $(BET^b - BET^a)/$ $BET^a$ | Initial coulomb efficiency | Post-cycling thickness swelling rate (500 cycles) |
|---|---|---|---|---|---|
| Example 29 | 21 | 0.998 | 0.19 | 92.7% | 8.4% |
| Example 30 | 22 | 0.990 | 0.21 | 92.0% | 8.4% |
| Example 31 | 23 | 0.979 | 0.25 | 91.2% | 8.5% |

The results show that when the lithium-ion battery was in the fully discharged state, $D^bv50/D^av50$ of the negative electrode active material and $(BET^b-BET^a)/BET^a$ of the negative electrode active material would affect the increase of the initial coulomb efficiency of the lithium-ion battery, and would also affect the post-cycling thickness swelling rate of the lithium-ion battery.

Figure 1:
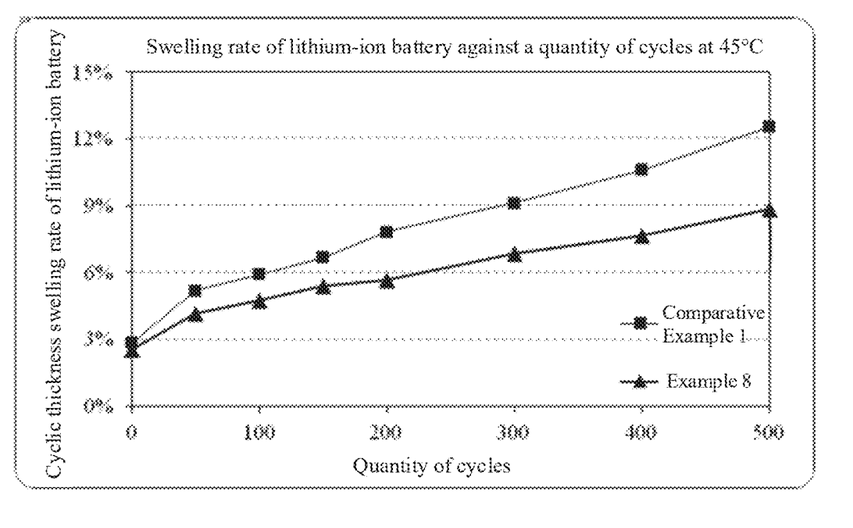
Figure shows swelling percentages of lithium-ion batteries with a quantity of cycles at 45° C. according to Example 22 and Comparative Example 1 of this application.

Figure shows post-cycling thickness swelling rates of lithium-ion batteries against a quantity of cycles in Example 8 and Comparative Example 1. The results show that compared to Comparative Example 1, the lithium-ion battery in Example 8 had a significantly lower post-cycling thickness swelling rate. As a quantity of cycles increased, a difference between the post-cycling thickness swelling rates of the two was significant.

References to "the embodiments", "some of the embodiments", "an embodiment", "another example", "examples", "specific examples", or "some examples" in the specification mean the inclusion of specific features, structures, materials, or characteristics described in the embodiment or example in at least one embodiment or example of this application. Accordingly, descriptions appearing in the specification, such as "in some embodiments", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. A negative electrode active material, wherein the negative electrode active material has a median particle size $D^1v50$; after being compressed under a pressure of 1 t, the negative electrode active material has a median particle size $D^2v50$, and $D^2v50/D^1v50$ is greater than or equal to 0.8;
   wherein the negative electrode active material comprises graphite particles, according to an X-ray diffraction measurement, a grain size Lc of the graphite particles in a vertical direction is 30 nm to 32 nm.

2. The negative electrode active material according to claim 1, wherein the negative electrode active material has a specific surface area $BET^1$, $BET^1$ is 0.6 m²/g to 2.0 m²/g; after being compressed under a pressure of 1 t, the negative electrode active material has a specific surface area $BET^2$, and $(BET^2-BET^1)/BET^1 \leq 1$.

3. The negative electrode active material according to claim 1, wherein the graphite particles further satisfy at least one of conditions (a) to (c):
   (a) $D^1v50$ is 10 μm to 25 μm;
   (b) $D^1v90$ and $D^1v10$ satisfy that $D^1v90/D^1v10$ is less than 3.5; or (c) according to the X-ray diffraction measurement, a grain size La of the graphite particles in a horizontal direction is 160 nm to 165 nm.

4. An electrochemical device, wherein the electrochemical device comprises a negative electrode, the negative electrode comprises a negative electrode current collector and a negative electrode active material layer, and the negative electrode active material layer comprises a negative electrode active material, wherein the negative electrode active material has a median particle size $D^1v50$; after being compressed under a pressure of 1 t, the negative electrode active material has a median particle size $D^2v50$, and $D^2v50/D^1v50$ is greater than or equal to 0.8;

wherein the negative electrode active material comprises graphite particles, according to an X-ray diffraction measurement, a grain size Lc of the graphite particles in a vertical direction is 30 nm to 32 nm.

5. The electrochemical device according to claim 4, wherein the negative electrode active material has a specific surface area $BET^1$, $BET^1$ is 0.6 m$^2$/g to 2.0 m$^2$/g; after being compressed under a pressure of 1 t, the negative electrode active material has a specific surface area $BET^2$, and $(BET^2-BET^1)/BET^1 \le 1$.

6. The electrochemical device according to claim 4, wherein the graphite particles further satisfy at least one of conditions (a) to (c):
(a) $D^1v50$ is 10 μm to 25 μm;
(b) $D^1v90$ and $D^1v10$ satisfy that $D^1v90/D^1v10$ is less than 3.5; or
(c) according to the X-ray diffraction measurement, a grain size La of the graphite particles in a horizontal direction is 160 nm to 165 nm.

7. The electrochemical device according to claim 4, wherein the negative electrode active material layer satisfies at least one of conditions (d) to (f):
(d) the negative electrode active material layer comprises carbon element and oxygen element, and a weight ratio of the carbon element content to the oxygen element content is 2:3 to 990:1;
(e) as measured through an X-ray diffraction spectrum, a ratio C004/C110 of the negative electrode active material layer is 5.7 to 18, C004 is a peak area of a (004) plane of the negative electrode active material layer, C110 is a peak area of a (110) plane of the negative electrode active material layer; or
(f) a porosity of the negative electrode active material layer is 20% to 30%.

8. The electrochemical device according to claim 4, wherein when the electrochemical device is in a fully discharged state, as measured through an X-ray diffraction spectrum, a ratio C004'/C110' is 6.8 to 17.2, C004' is a peak area of a (004) plane of the negative electrode active material layer, C110' is a peak area of a (110) plane of the negative electrode active material layer.

9. The electrochemical device according to claim 4, wherein when the electrochemical device is in a fully discharged state, the negative electrode active material has a median particle size $D^av50$; after being compressed under a pressure of 1 t, the negative electrode active material has a median particle size $D^bv50$, and $D^bv50/D^av50$ is greater than or equal to 0.9.

10. The electrochemical device according to claim 4, wherein when the electrochemical device is in a fully discharged state, a median particle size $D^av50$ of the negative electrode active material is 8 μm to 20 μm.

11. The electrochemical device according to claim 4, wherein when the electrochemical device is in a fully discharged state, the negative electrode active material has a specific surface area $BET^a$; after being compressed under a pressure of 1 t, the negative electrode active material has a specific surface area $BET^b$, and $(BET^b-BET^a)/BET^a<0.6$.

12. An electronic device, wherein the electronic device comprises an electrochemical device, wherein the electrochemical device comprises a negative electrode, the negative electrode comprises a negative electrode current collector and a negative electrode active material layer, and the negative electrode active material layer comprises a negative electrode active material, wherein the negative electrode active material has a median particle size $D^1v50$; after being compressed under a pressure of 1 t, the negative electrode active material has a median particle size $D^2v50$, and $D^2v50/D^1v50$ is greater than or equal to 0.8;

wherein the negative electrode active material comprises graphite particles, according to an X-ray diffraction measurement, a grain size Lc of the graphite particles in a vertical direction is 30 nm to 32 nm.

13. The electronic device according to claim 12, wherein the negative electrode active material has a specific surface area $BET^1$, $BET^1$ is 0.6 m$^2$/g to 2.0 m$^2$/g; after being compressed under a pressure of 1 t, the negative electrode active material has a specific surface area $BET^2$, and $(BET^2-BET^1)/BET^1 \le 1$.

14. The electronic device according to claim 12, wherein the graphite particles further satisfy at least one of conditions (a) to (c):
(a) $D^1v50$ is 10 μm to 25 μm;
(b) $D^1v90$ and $D^1v10$ satisfy that $D^1v90/D^1v10$ is less than 3.5; or
(c) according to the X-ray diffraction measurement, a grain size La of the graphite particles in a horizontal direction is 160 nm to 165 nm.

15. The electronic device according to claim 12, wherein the negative electrode active material layer satisfies at least one of conditions (d) to (f):
(d) the negative electrode active material layer comprises carbon element and oxygen element, and a weight ratio of the carbon element content to the oxygen element content is 2:3 to 990:1;
(e) as measured through an X-ray diffraction spectrum, a ratio C004/C110 of the negative electrode active material layer is 5.7 to 18, C004 is a peak area of a (004) plane of the negative electrode active material layer, C110 is a peak area of a (110) plane of the negative electrode active material layer; or
(f) a porosity of the negative electrode active material layer is 20% to 30%.

16. The electronic device according to claim 12, wherein when the electrochemical device is in a fully discharged state, as measured through an X-ray diffraction spectrum, a ratio C004'/C110' is 6.8 to 17.2, C004' is a peak area of a (004) plane of the negative electrode active material layer, C110' is a peak area of a (110) plane of the negative electrode active material layer.

17. The negative electrode active material according to claim 1, wherein $D^2v50/D^1v50$ is greater than or equal to 0.8 and less than 1.0.

18. The negative electrode active material according to claim 1, wherein the negative electrode active material has a particle size $D^1v90$ and $D^1v10$, and $D^1v90/D^1v10$ is less than 3.0.

19. The negative electrode active material according to claim 1, wherein the negative electrode active material has a specific surface area $BET^1$; after being compressed under a pressure of 1 t, the negative electrode active material has a specific surface area $BET^2$, and $0.17 \leq (BET^2-BET^1)/BET^1 \leq 0.98$.

20. The electrochemical device according to claim 4, wherein $D^2v50/D^1v50$ is greater than or equal to 0.8 and less than 1.0.

21. The electrochemical device according to claim 20, wherein $D^2v50/D^1v50$ is greater than or equal to 0.9 and less than 1.0.

22. The electrochemical device according to claim 20, wherein the negative electrode active material has a specific surface area $BET^1$; after being compressed under a pressure of 1 t, the negative electrode active material has a specific surface area $BET^2$, and $(BET^2-BET^1)/BET^1 \leq 1$.

23. The electrochemical device according to claim 22, wherein $0.17 \leq (BET^2-BET^1)/BET^1 \leq 0.98$.

24. The electronic device according to claim 12, wherein $D^2v50/D^1v50$ is greater than or equal to 0.8 and less than 1.0.

* * * * *